(Model.)

W. E. CONNER.
CHURN DASHER.

No. 245,058. Patented Aug. 2, 1881.

Witnesses:
H. H. Mortimer
Wm. H. Kern

Inventor:
W. E. Conner,
per
F. A. Lehmann,
Atty

UNITED STATES PATENT OFFICE.

WILSON E. CONNER, OF TUPPER'S PLAINS, OHIO.

CHURN-DASHER.

SPECIFICATION forming part of Letters Patent No. 245,058, dated August 2, 1881.

Application filed June 10, 1881. (Model.)

*To all whom it may concern:*

Be it known that I, WILSON E. CONNER, of Tupper's Plains, in the county of Meigs and State of Ohio, have invented certain new and useful Improvements in Churn-Dashers; and I do hereby declare the following to be a full, clear, and exact description of the invention, such as will enable others skilled in the art to which it pertains to make and use it, reference being had to the accompanying drawings, which form part of this specification.

My invention relates to an improvement in churn-dashers; and it consists in the combination of two perforated cones, one of which is placed inside of the other, and a removable perforated bottom, which has the smaller cone secured to it, and which can be readily attached to and removed from the outer cone, as will be more fully described hereinafter.

The object of my invention is to produce a churn-dasher which will break up the globules of cream which hold the butter as rapidly as possible, and which can be readily separated, so that the parts thereof can be thoroughly and quickly cleaned.

Figure 1:
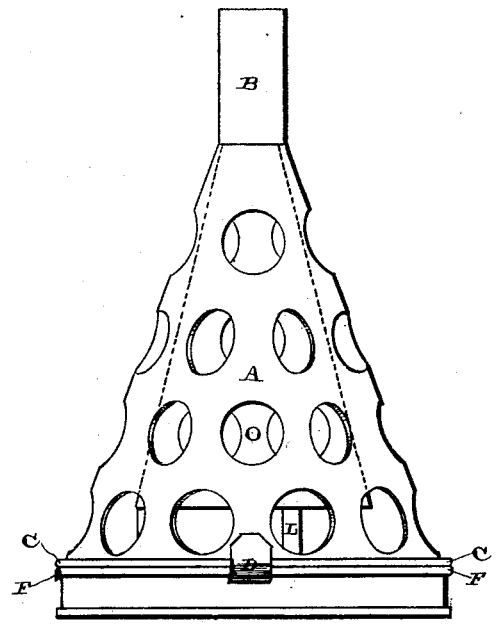
Figure 2:
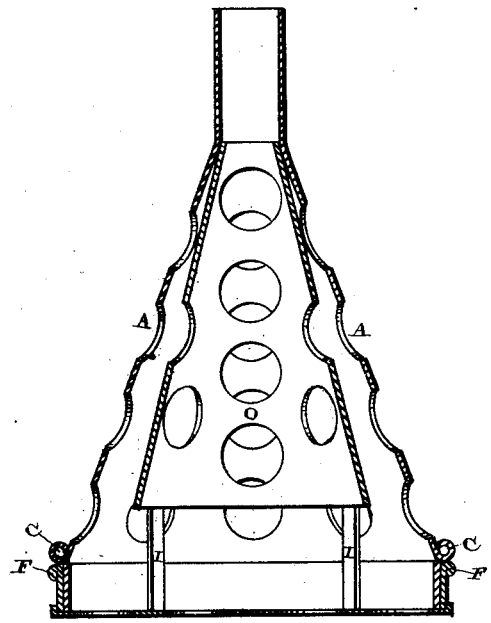

Figure 1 is a side elevation of my machine. Fig. 2 is a vertical section of the same.

A represents the outer cone, which is made of any suitable perforated material, and which has the socket B secured to its upper end to receive the lower end of the handle. This cone is braced and strengthened around its side, near its lower edge, by means of heavy wires C. In between the ends of these strengthening-wires are secured the two catches D, which consist of strong metallic plates which are bent into half-circles, as shown, and into which half-circles the ends of the strengthening-wires F, secured to the top edge of the bottom G, catch. This bottom is also made of perforated sheet metal, and can readily be attached to the bottom of the cone A or removed therefrom by passing the flange upon the top of the bottom up over the bottom edge of the cone A, so that the catches D will extend down between the ends of the wires which are secured to the bottom, and then giving the bottom a partial turn, so that one end of each of the wires will pass into one of the catches. Secured to the top of this bottom by means of the standards or supports I is the second cone, O, which fits into the cone A, as shown, there being a sufficient space left between the two cones for the cream to pass freely through between them. This smaller dasher is secured to the bottom, as shown, so that when the bottom is removed this cone will be removed with it, and thus enable the parts to be separated, so that they can be easily and thoroughly cleaned. The two cones being perforated, when in position will have the solid portions of one part just opposite to the perforated part of the other, so that as a current of cream is moving through one part it will strike against these solid portions just opposite the holes, and thus be broken up and subdivided into a number of smaller currents. The vertical play of this dasher through the cream will cause the cream to be broken into separate currents in passing through both the bottom, the inner cone, and the outer one, and in this manner the globules holding the butter will be quickly broken.

Having thus described my invention, I claim—

1. A churn-dasher composed of the outer perforated cone, A, the perforated bottom G, and the inner perforated cone, O, that is secured to the bottom, by means of the supports I, so that when the bottom is removed the inner cone will be removed with it, substantially as shown.

2. The combination of the outer perforated cone, A, provided with the divided strengthening-wires C around its side and the catches D, with the perforated bottom G, provided with the divided wires F, the inner cone, O, and the supports I, by means of which the inner cone is secured to the bottom, substantially as set forth.

In testimony whereof I affix my signature in presence of two witnesses.

WILSON ELI CONNER.

Witnesses:
  E. O. HOYT,
  A. B. HOYT.